US008335768B1

(12) United States Patent
Desai et al.

(10) Patent No.: US 8,335,768 B1
(45) Date of Patent: Dec. 18, 2012

(54) SELECTING DATA IN BACKUP DATA SETS FOR GROOMING AND TRANSFERRING

(75) Inventors: Asit Desai, San Ramon, CA (US);
Richard Zulch, Orinda, CA (US);
Dennis B. Jones, El Cerrito, CA (US)

(73) Assignee: EMC Corporation, Hopkinton, MA (US)

( * ) Notice: Subject to any disclaimer, the term of this patent is extended or adjusted under 35 U.S.C. 154(b) by 623 days.

(21) Appl. No.: 11/139,013

(22) Filed: May 25, 2005

(51) Int. Cl.
*G06F 7/00* (2006.01)
*G06F 17/00* (2006.01)

(52) U.S. Cl. ........ 707/674; 707/679; 707/694; 711/161; 711/162

(58) Field of Classification Search ............. 707/1–206, 707/600–831, 899, 999.001–999.206
See application file for complete search history.

(56) References Cited

U.S. PATENT DOCUMENTS

| | | | |
|---|---|---|---|
| 4,467,421 A | 8/1984 | White | |
| 5,506,986 A | 4/1996 | Healy | |
| 5,574,906 A | 11/1996 | Morris | |
| 5,754,782 A | 5/1998 | Masada | |
| 5,758,359 A | 5/1998 | Saxon | |
| 5,845,292 A * | 12/1998 | Bohannon et al. | 707/202 |
| 5,943,688 A * | 8/1999 | Fisher et al. | 711/162 |
| 6,038,379 A * | 3/2000 | Fletcher et al. | 709/230 |
| 6,061,769 A | 5/2000 | Kapulka et al. | |
| 6,240,527 B1 * | 5/2001 | Schneider et al. | 714/21 |
| 6,253,193 B1 * | 6/2001 | Ginter et al. | 705/57 |
| 6,317,754 B1 * | 11/2001 | Peng | 707/203 |
| 6,393,537 B1 | 5/2002 | Kern et al. | |
| 6,484,187 B1 * | 11/2002 | Kern et al. | 707/204 |
| 6,594,676 B1 | 7/2003 | Moore | |
| 6,633,878 B1 | 10/2003 | Underwood | |
| 6,651,077 B1 | 11/2003 | East et al. | |
| 6,704,755 B2 * | 3/2004 | Midgley et al. | 707/204 |
| 6,802,025 B1 * | 10/2004 | Thomas et al. | 714/15 |
| 6,898,681 B2 | 5/2005 | Young | |
| 6,912,629 B1 | 6/2005 | West et al. | |
| 6,981,114 B1 | 12/2005 | Wu et al. | |
| 7,043,504 B1 | 5/2006 | Moore et al. | |
| 7,325,159 B2 | 1/2008 | Stager et al. | |
| 7,325,161 B1 | 1/2008 | Rakic et al. | |
| 7,360,123 B1 | 4/2008 | Westenberg et al. | |
| 7,657,582 B1 | 2/2010 | Cram et al. | |
| 7,689,599 B1 * | 3/2010 | Shah et al. | 714/19 |
| 7,925,623 B2 | 4/2011 | Therrien et al. | |
| 2002/0073289 A1 * | 6/2002 | Hyytiainen et al. | 711/162 |
| 2002/0101426 A1 * | 8/2002 | Okamura | 345/530 |
| 2003/0167380 A1 | 9/2003 | Green et al. | |
| 2003/0188303 A1 * | 10/2003 | Barman et al. | 717/170 |
| 2003/0220949 A1 | 11/2003 | Witt et al. | |

(Continued)

OTHER PUBLICATIONS

Ashlee Vance, Veritas goes hetero with new Netbackup, Apr. 26, 2005 http://www.theregister.co.uk/2005/04/26/veritas_netbackup_six/.

(Continued)

*Primary Examiner* — Angelica Ruiz
(74) *Attorney, Agent, or Firm* — Van Pelt, Yi & James LLP

(57) ABSTRACT

A method for grooming a backup data set is disclosed. The method comprises receiving data associated with one or more restore points associated with the backup data set. The method further comprises automatically selecting one or more of said one or more restore points for retention, removal, or transfer.

40 Claims, 10 Drawing Sheets

U.S. PATENT DOCUMENTS

| | | |
|---|---|---|
| 2003/0225800 A1 | 12/2003 | Kavuri |
| 2004/0088331 A1 | 5/2004 | Therrien et al. |
| 2004/0225659 A1* | 11/2004 | O'Brien et al. ............. 707/9 |
| 2005/0021566 A1* | 1/2005 | Mu ............................ 707/200 |
| 2005/0021567 A1* | 1/2005 | Holenstein et al. ........ 707/200 |
| 2005/0071286 A1* | 3/2005 | Laicher et al. ............. 705/400 |
| 2005/0076005 A1* | 4/2005 | Chefalas et al. ............ 707/2 |
| 2005/0097105 A1* | 5/2005 | Ranta ......................... 707/10 |
| 2005/0108302 A1 | 5/2005 | Rand et al. |
| 2005/0188256 A1 | 8/2005 | Stager et al. |
| 2005/0216788 A1* | 9/2005 | Mani-Meitav et al. ........ 714/6 |
| 2005/0267916 A1* | 12/2005 | Tone et al. .................. 707/200 |
| 2006/0004820 A1 | 1/2006 | Claudatos et al. |
| 2006/0053178 A1* | 3/2006 | van Ingen et al. ........... 707/204 |
| 2006/0053181 A1* | 3/2006 | Anand et al. ................ 707/204 |
| 2006/0053182 A1* | 3/2006 | Sen et al. .................... 707/204 |
| 2006/0137010 A1* | 6/2006 | Kramer et al. ............... 726/22 |
| 2007/0185936 A1 | 8/2007 | Derk et al. |
| 2008/0010422 A1 | 1/2008 | Suzuki et al. |
| 2008/0059734 A1 | 3/2008 | Mizuno |

OTHER PUBLICATIONS

Quantum; *Data Keeper Software Automatically Backs Up Windows Clients*;http://www.unylogix.com/data_storage/nas/quantum/pdf/brochure_datakeeper_2002-09-12.pdf ; 2002 Quantum Corporation; USA.

Symantec; *DataKeeper Backup FAQ*; http://service1.symantec.com/SUPPORT/powerquest.nsf/pfdocs/2004044283360062?Open&docid=2004044283360062&nsf=powerquest.nsf&view=docid; 1198-2008 Symantec Corporation; USA.

"CommVault Galaxy Provides Worldwide Exchange Backup and Recovery for Royal Dutch Shell Group of Companies," 2000, commvault, pp. 1-2.

M. Tamer Ozsu and Patrick Valduriez, Principles of Distributed Database Systems, 1999, Prentice-Hall, Second Edition, pp. 363-390.

\* cited by examiner

SELECTING DATA IN BACKUP DATA SETS FOR GROOMING AND TRANSFERRING

BACKGROUND OF THE INVENTION

Data backup for a computer system's stored data involves storing, at different times, copies of the data in a secondary storage location, e.g., on a secondary storage media or device or in a secondary location on a primary storage media or device. The copies are often compressed and managed by a backup software system. Managing the copies of the computer system's stored data includes understanding the data's relevance with respect to time; some data is relevant for long periods of time (i.e. medical records or financial records), and some data is relevant for short periods of time (i.e. email server or cached data from web browsers). Managing the copies of the computer system's stored data also includes understanding the requirements for availability of the copies; some data may be required to be available with a few hours notice, some data may be required to be available with a week's notice, and some data may be required to be available despite the destruction of the source computer system. Current approaches are inefficient because they do not take into account the varied time relevance and availability requirements different data have. Keeping all data for the longest retention period applicable to any portion thereof results in unneeded data being retained, increasing storage and management costs. Likewise, keeping all data at the highest level of availability applicable to any portion thereof results in data that could not be sent offsite, e.g., being kept close at hand, again increasing storage and administrative costs. Segregating data having different retention and/or availability requirements may not always be practicable and has higher costs associated with it as well. There is a need therefore for backup management capabilities that take into account the varied requirements of data in backup data sets.

BRIEF DESCRIPTION OF THE DRAWINGS

Various embodiments of the invention are disclosed in the following detailed description and the accompanying drawings.

DETAILED DESCRIPTION

Figure 1:
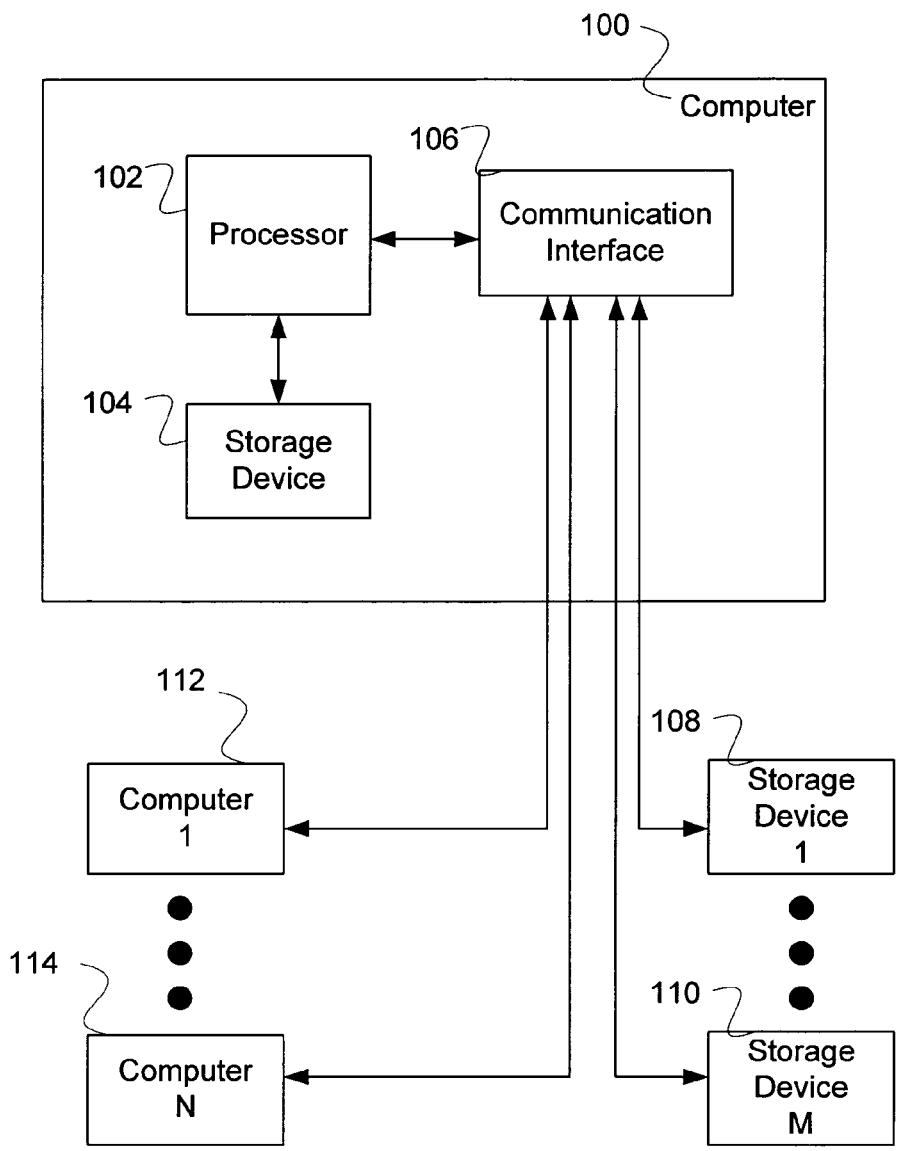
FIG. 1 illustrates an embodiment of a system for grooming backup data.

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Automatically selecting data in backup data sets for grooming and/or transfer is disclosed. In some embodiments, data is selectively transferred from, removed from, and/or retained in a backup dataset based at least in part on an at least partly automated selection process that takes into account the varied time relevance and availability requirements different data have. In some embodiments, selected data comprising a backup data set is selected to be retained in a grooming or included in a transfer operation based at least in part on the desired time relevance of the data, e.g., a retention period applicable to the data by virtue of a regulatory requirement, organizational or user policy, etc., and/or a heuristic or other time based criteria that ensures that more relevant data, e.g., more recently stored or revised data, is included (or included with higher frequency or granularity) than older or unchanged data. In some embodiments, selected data comprising a backup data set is selected to be retained in a grooming or included in a transfer operation based at least in part on availability requirements in that data is selectively stored in multiple redundant locations according to the desired availability of the data, e.g., so that certain data is available immediately from a local backup storage device or media whereas older or other data less likely to be needed quickly is stored offsite. In some embodiments, backup data is selected to be transferred, retained, and/or removed by indicating one or more restore points to be retained and/or removed. As used herein, a "restore point" refers to all files/directories as they existed at a particular instance in time, e.g., as of the time of an associated backup operation. In some embodiments, a restore point may comprise a synthetic full backup. In some embodiments, specific files (e.g., as stored on backup media as part of a backup data set) may be designated for transfer, retention, and/or removal. In some embodiments, a restore point provides the ability to restore files and directories as they existed at a particular instance in time using incremental backups.

In the following, selecting data in a backup data set is discussed in the context of grooming a backup data set which includes selectively retaining and/or removing data in the backup data set. In some embodiments, selecting is used for selecting data in a backup data set for transferring to a transfer data set. In some embodiments, the selected data comprises a subset of data comprising a backup data set which subset is transferred to a second backup storage device or media, e.g., to enable the selected subset of data to be stored in a second physical device or location.

FIG. 1 illustrates an embodiment of a system for grooming backup data. In the example shown, computer 100 contains processor 102 for executing the instructions relevant to the system for grooming backup data sets, storage device 104 for storing instructions for processor 102, and communication interface 106 capable of connecting to one or more computers and to one or more storage devices. In various embodiments, communication interface 106 to the one or more computers and the one or more storage devices includes a local area network interface, a wide area network interface, an Ethernet interface, and/or a World Wide Web interface. The plurality of computers (represented in FIG. 1 by first computer 112 and $n^{th}$ computer 114) contain files/directories that may need to be backed up or may contain storage devices (e.g., disk drives) that are used to hold backup data. The plurality of storage devices (represented in FIG. 1 by first storage device 108 and $m^{th}$ storage device 110) may contain files/directories that may need to be backed up or may comprise storage devices and/or be associated with removable or other storage media that are used to hold backup data. In some embodiments, communication interface 106 connects to no computers. In some embodiments, communication interface 106 connects to no storage devices. In some embodiments, computer 100 is configured to groom a backup data set associated with one or more of computers 112-114 and/or storage devices 108-110, as described more fully below. In some embodiments, all or part of the backup data that is groomed by computer 100 may be associated with source data associated with computer 100. In some embodiments, the backup data that is groomed may itself reside on computer 100, e.g., on a hard drive.

Figure 2:
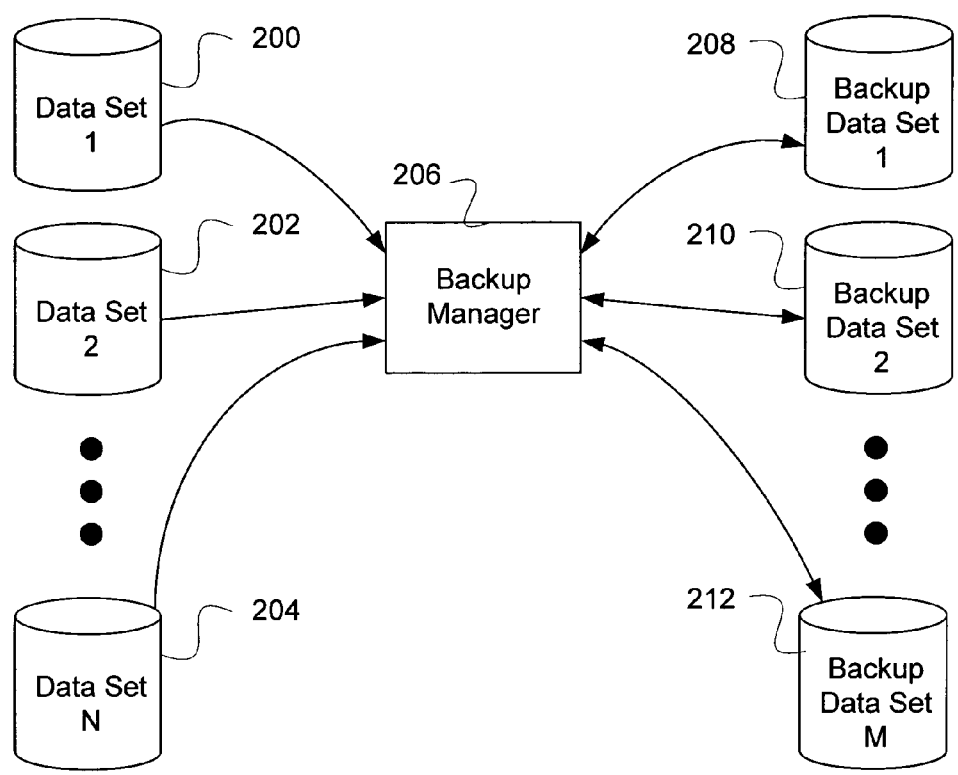
FIG. 2 illustrates an embodiment of a system for grooming backup data.

FIG. 2 illustrates an embodiment of a system for grooming backup data. In the example shown, a plurality of data sets (represented in FIG. 2 by first data set 200, second data set 202, and $n^{th}$ data set 204) are processed by backup manager 206 to create a plurality of backup data sets (represented in FIG. 2 by first backup data set 208, second backup data set 210, and $m^{th}$ backup data set 212). In the example shown, backup manager 206 also manages the plurality of backup data sets by grooming the plurality of backup data sets. In other embodiments, grooming may be performed at least in part by a system or process other than a system or process used to create the backup data sets. In some embodiments, grooming may be performed with respect to a single backup data set comprising backup data associated with a single set of source data.

Selecting data in a backup data set for grooming and transferring is disclosed. In some embodiments, grooming a backup data set includes selectively removing and/or retaining data included in the backup data set, e.g., based on some criterion or set of criteria and transferring a backup data set includes selectively transferring data included in the backup data set. In some embodiments, data is selected to be retained in and/or removed from or transferred from the backup data set based at least in part on a time-based criterion or heuristic, such as an amount of time that has passed since particular data was added to the backup data set and/or a particular time or event, such as a particular backup operation, with which the data is associated. In some embodiments, data is selected to be retained in and/or removed from or transferred from the backup data set based at least in part on restore points. In various embodiments, grooming or transfer occurs automatically when needed (i.e. when the secondary storage device is full); at media request (e.g. when the user decreases the number of backup sessions allowed on the backup media), on a scheduled basis, or when manually triggered (e.g. when the user decreases the amount of disc space available for the backup data sets), or when triggered by a trigger external to the backup system (e.g. a storage system might be used for storing backup data sets and emails; if the email system needs more space on the storage system, it might invoke grooming on the backup data sets in order to free up space on the storage system). In some embodiments, a trigger external to the backup system may include using an Application Programming Interface (API).

Figure 3:
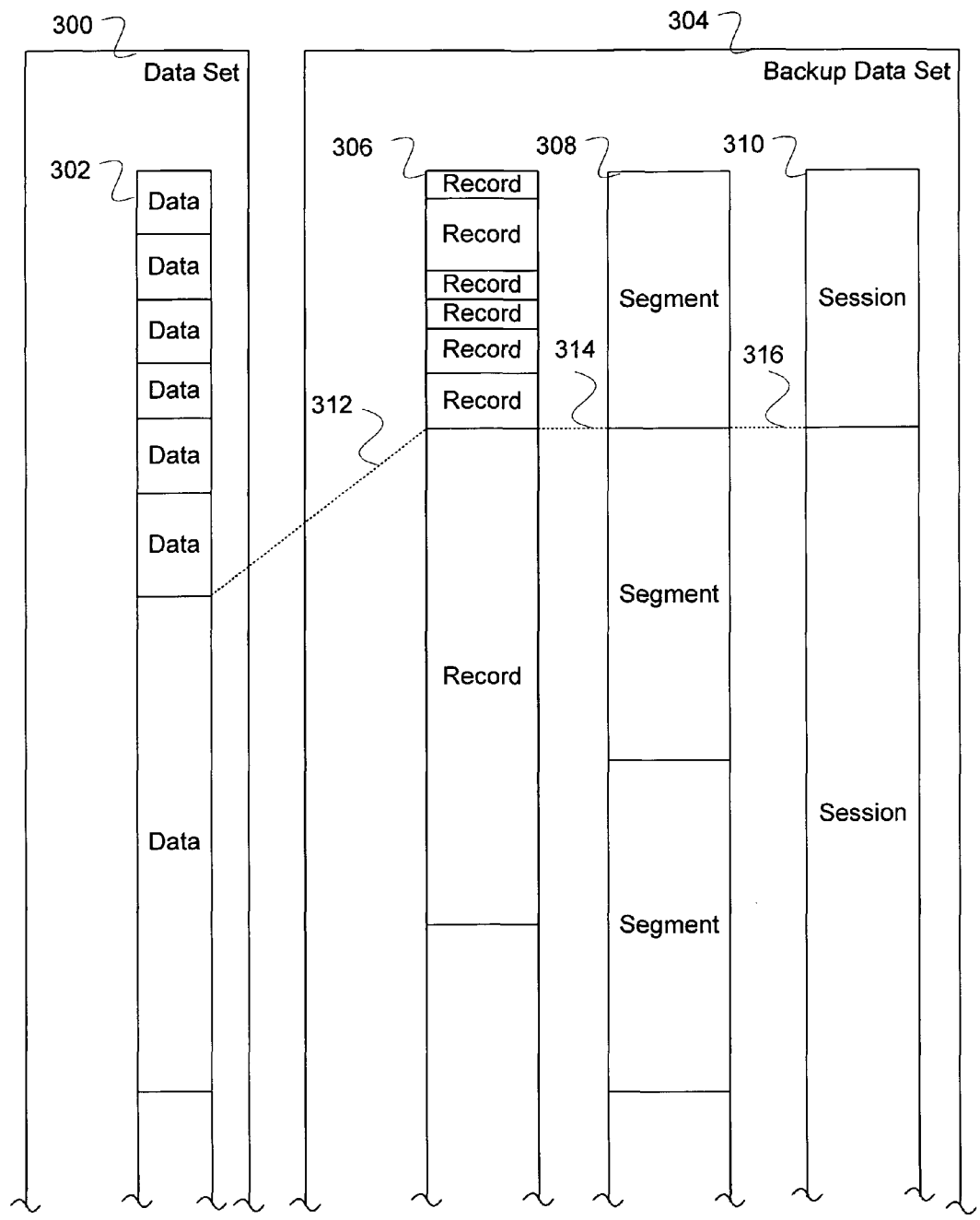
FIG. 3 illustrates an example of data organization in a source data set and a backup data set in one embodiment.

FIG. 3 illustrates an example of data organization in a source data set and a backup data set in one embodiment. In the example shown, data set 300 contains a plurality of data such as data 302. In some embodiments, data 302 comprises a file, a piece of a file, a directory, or a copy of a directory at a particular time. Backup data set 304 contains records corresponding to data in data set 300. For example, record 306 corresponds to data 302. Line 312 indicates a corresponding boundary between data in data set 300 and records in backup data set 304. Records can be smaller than data because the backup manager before storing the records uses data compression. Within backup data set 304 records are organized into sessions. Sessions are groups of backup data stored at the same time. Segment 308 contains record 306. Line 314 indicates a corresponding boundary between records and segments. Segments correspond to a contiguous piece of storage space. The end of a segment may be associated with the end of the backup (i.e. session), the end of the backup storage media, or a maximum limit size. In some embodiments, the maximum limit size is 600 megabytes. Sessions are stored in one or more segments. In the example shown, session 310 contains segment 308. Line 316 indicates a corresponding boundary between sessions and segments. A session may have more than one segment associated with it.

In some embodiments, a backup data set contains backup information in addition to backup data. Backup information may be stored in one or more records comprising a backup data set. In various embodiments, backup information may include a catalog of the contents of the backup set or data to recreate a catalog of the contents of the backup data set. In some embodiments the catalog includes one or more indexes of the source data set at particular backup times and the corresponding locations at which each element of source data is stored on backup media, also called a restore point index. In some embodiments, the backup information includes for each backup session (i.e., operation or event) session data identifying the data actually copied to backup media during the session. In some embodiments, if a file in the index of a data set at a particular backup time already exists in the backup data set because it had not changed from a previous backup, then the file is not stored again during the current backup session, and in some such embodiments the session data is associated with source data that has changed (or is new) since the last backup session. In some embodiments, a restore point index points to data in one or more sets of session data to indicate for each element of source data (e.g., each file and directory) the session(s) during which the element of source data as it existed at the time of the backup with which the restore point index is associated was stored. In some embodiments, the combination of the restore point index and the session data makes it possible to determine for each element of data associated with a restore point index the location on backup media of the corresponding backup data, which in turn makes it possible to use the backup data set to reconstruct the source data set in the form it existed at the time associated with the restore point index, e.g., at the time of a backup operation with which the restore point index is associated. The backup information stored with a backup data set may include other and/or different information about the backup data set, the source data set from which it originated, and/or the backup sessions through which the backup data set was generated.

Figure 4:
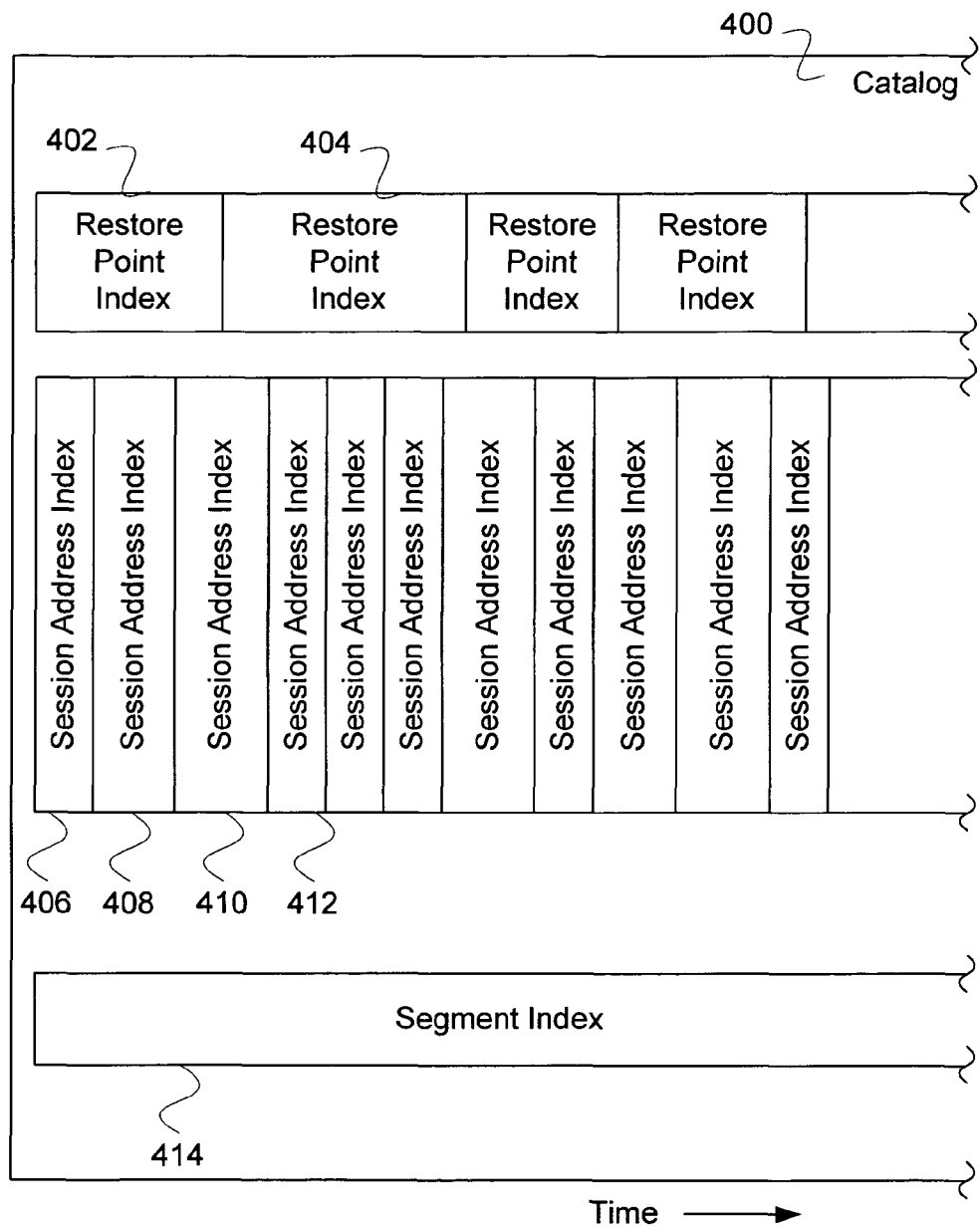
FIG. 4 illustrates an example of a catalog in one embodiment.

FIG. 4 illustrates an example of a catalog in one embodiment. In some embodiments, the catalog is similar to the catalog that can be found in U.S. Pat. No. 5,150,473 entitled DATA STORAGE FORMAT FOR ADDRESSABLE OR SEQUENTIAL MEMORY MEDIA filed Jan. 16, 1990, which is incorporated herein by reference for all purposes. In the example shown, catalog 400 contains a plurality of restore point indexes and a plurality of session address indexes. As time passes, the number of restore point indexes and session address indexes increases. Restore point index 402 may point to files stored during a number of sessions. For example, restore point index 402 may point to files that are in session address index 406, session address index 408, and session address index 410. The session may not be before the restore point index time because, for example, during a verification step it was realized that a file was not properly saved to the backup set and so a save to the backup set is done subsequent to the session corresponding to the time of the restore point index. Subsequent restore point index 404 may point to files that are in session address index 406, session address index 410, and session address index 412 because, for example, the files indicated by restore point index 404 are no longer the same as any in session address index 408. Catalog 400 contains segment index 414. Segment index 414 is an index of addresses for the segments in the backup data set.

Figure 5:
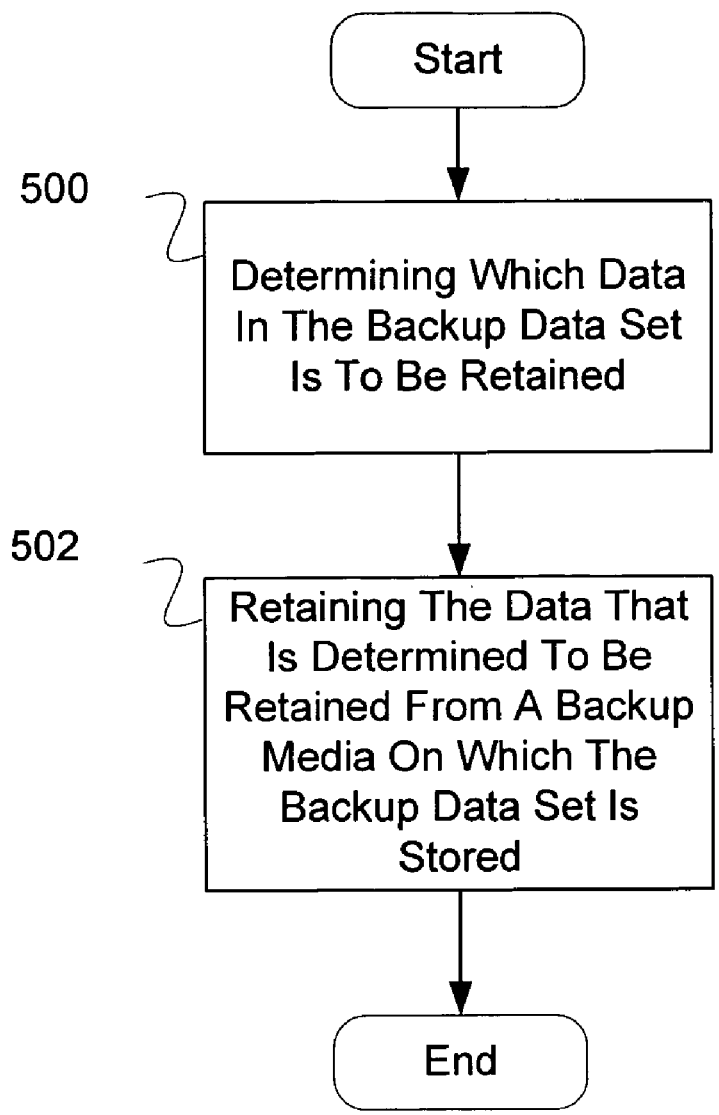
FIG. 5 illustrates an embodiment of a process for grooming backup data sets.

FIG. 5 illustrates an embodiment of a process for grooming backup data sets. In the example shown, in 500, it is determined which data in the backup data set is to be retained. In various embodiments, the data in the backup data set that is to be backed up is selected by using one or more of the following: restore points, file types (i.e. accounting files, medical records, or mp3 files), source program (i.e. accounting database, spreadsheet, or presentation display program), size (e.g., remove all files larger than 10 gigabyte), computer system (i.e. mail server, database server, laptop, or software development server), or using other relevant attributes. For example, in some embodiments a user indicates a restore point to be retained and the backup data (and in some embodiments backup information) associated with the restore point—i.e., the subset of backup data required to reconstruct the source data set in the state it was in at the time of a backup operation with which the restore point is associated—is identified automatically. In 502, the data in the backup data set that is determined to be retained is retained on a backup media on which the backup data set is stored.

Figure 6:
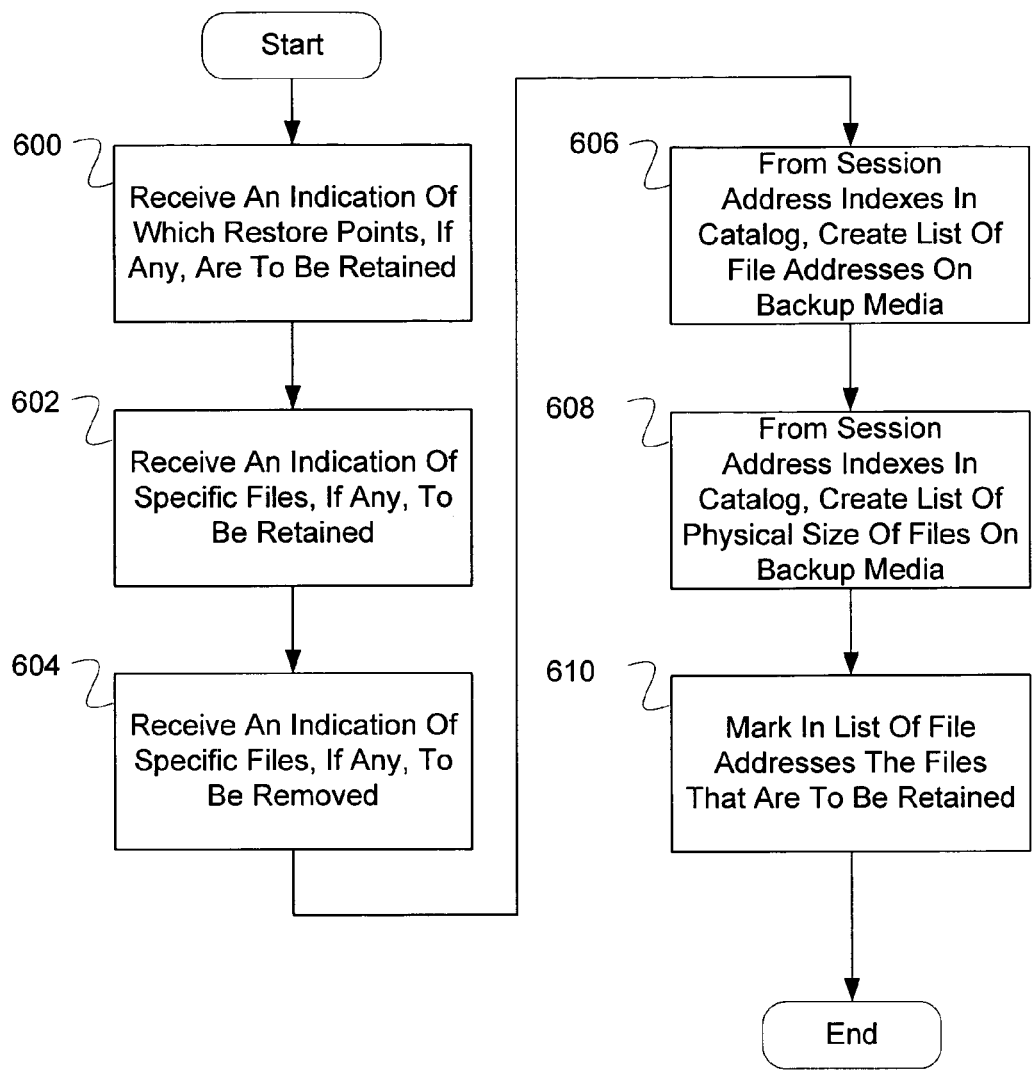
FIG. 6 illustrates an embodiment of a process for determining which data in the backup data set is to be retained.

FIG. 6 illustrates an embodiment of a process for determining which data in the backup data set is to be retained. In some embodiments, the process of FIG. 6 is used to implement 500 of FIG. 5. In the example shown, an indication is received in 600 as to which restore points, if any, are to be retained. In some embodiments, if a restore point is to be retained, all backup data required to restore (i.e., reconstruct) the source data set to the state it was in at a backup time associated with the restore point is identified automatically and retained. In some embodiments, if one or more restore points are to be retained, backup data (and in some embodiments backup information) associated with the restore point(s) to be retained is retained in the backup data set and other data is not retained unless otherwise marked for retention. In 602, an indication is received as to which specific files, if any, are to be retained. In 604, an indication is received as to which specific files, if any, are to be removed. In various embodiments, the indication(s) received in steps 600, 602, and 604 can be indicated by a user of the backup system, a system administrator, using a graphical user interface, a heuristic, a rule, a preference file, a predetermined list, an automated process, or any other method used for indicating on a computer system.

In some embodiments, one or more restore points may be selected for retention by an automated process. In some embodiments, restore points are selected automatically for retention based at least in part on a rule or algorithm for selecting restore points for retention that results in a higher frequency of restore points being retained for more recent restore points and a lower frequency of restore points being retained for less recent restore points. For example, in some embodiments a restore point for every day in the last week is selected for retention, but only one restore point for each of the remaining weeks in the last month is included. Or for example, restore points are retained for every week in the last month, but only one restore point is to be retained for the remaining months in the last year.

In some embodiments, a rule for selecting restore points to be retained includes having different frequencies of restore points selected to be retained based one or more of the following: a computer system or host with which the source data is associated, an application with which the source data is associated, or a process with which the source data is associated. For example, the mail server computer system may require more frequent retention of restore points in the recent past, but for several years ago, few restore points are required. Another example, a software development computer system may require frequent restore points all the time since it is important to be able to recover specific past instances of a developing software program.

In some embodiments, a rule for selecting restore points to be retained includes selecting the restore points based on criteria for backups. For example, criteria for backups may be to have at least five backups on site where four backups are from within the last week and one backup is at least one week old but not older than one month old. Or for example, criteria for backups may be to have at least three backups at another company location that are not older than one month and at least one backup at a third party site (i.e. a document warehouse) that is no older than six months. The backup system software, having been informed as to where the secondary storage device is located or where the secondary storage device media is to be located, would determine the restore points to be retained. In some embodiments, criteria for backups may indicate that a backup data set no older than one week is required to be available at two office locations.

In some embodiments, a rule for selecting restore points to be retained includes selecting the restore points based on criteria for restore points. For example, only the most recent restore point for each source is selected to be retained for grooming. This example is specifically useful for transfer where a rule that automatically selects most recent restore points for each source corresponding to previous transfer selections saves the user from selecting from among a number of restore points each time for a similar transfer.

In some embodiments, a rule for selecting specific files or data to be retained uses a time based criteria. In various embodiments, the time based criteria may be based on a relative time, an absolute time, or a restore point. For example, any files or data may be retained if they have been altered more recently than last week from the current date. Or for example, every third restore point may be retained for the last year. Or for example, all accounting files may be retained for the week following the end of a fiscal quarter. In some embodiments, a rule for selecting specific files or data to be retained includes retaining all files associated with a specific program or database. For example, all files or data associated with the accounting system are specified to be retained. In some embodiments, a rule for selecting specific files or data not to be retaining includes removing all files with specific filename extensions. For example, all files with extensions .mp3 (audio files) and .mov (movie files) are specified to be removed.

In some embodiments a restore point may be "locked" or designated automatically for retention, e.g., for regulatory or policy compliance purposes, and associated backup data and backup information marked for retention automatically, even if no other indication (e.g., user selection) that the restore point should be retained is received. This prevents the restore point from being designated for removal. In some embodiments, specific files and/or file types, e.g., certain financial or personnel files, may similarly be included automatically in a retention operation even if not otherwise designated, e.g., based on a regulatory requirement, organizational policy, etc.

In some embodiments a restore point may be blocked from retention, e.g., for retention policy or security purposes, and associated backup data and backup information blocked for retention, even if other indication (e.g., user selection) that the restore point should be retained is received. In some embodiments, specific files and/or file types, e.g., certain confidential or temporary files, may similarly be blocked in a retention operation even if otherwise designated, e.g., based on a regulatory requirement, organizational policy, etc. In some embodiments, blocking is based at in part on the user initiating the retention operation.

In some embodiments, a restore point index or other backup information associated with a restore point that is not to be retained in a backup data set is removed from the backup data set, along with backup data not associated with a restore point to be retained.

In 606, a list of file addresses on the backup media is created from the session address indexes. In 608, a list of physical file size on the backup media is created from the session address indexes. In 610, the files that are to be retained are marked in the list of file addresses. In some embodiments, the files to be retained are marked by marking the files that are to be removed. In various embodiments, the files to be retained are marked in the list of file addresses by negating the address or by negating the physical file size in the list of physical file size on the backup media.

Figure 7:
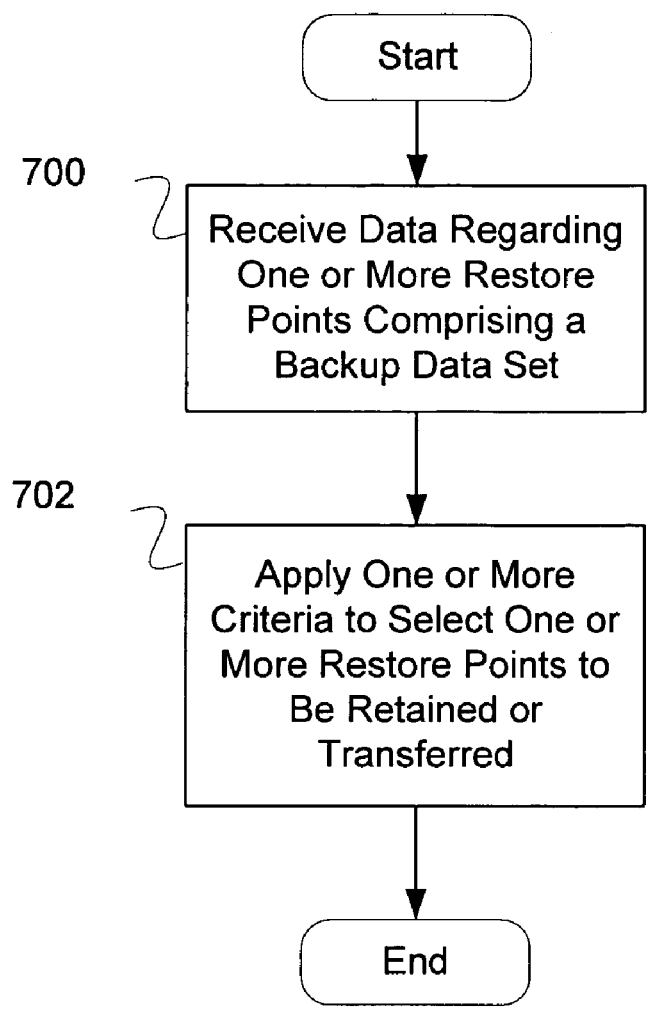
FIG. 7 illustrates an embodiment of a process for selecting restore points to be retained or transferred.

FIG. 7 illustrates an embodiment of a process for selecting restore points to be retained or transferred. In some embodiments, the process in FIG. 7 is used to implement 600 in FIG. 6. In the example shown, in 700, data is received regarding one or more restore points comprising a backup data set. In some embodiments, data received includes specific files to be retained, removed, or transferred. In 702, one or more restore points is selected to be retained and/or transferred based on one or more criteria. The criteria can allow for the restore points to be selected based on different requirements for data retention and data availability. In some embodiments, the criteria include criteria indicating requirements for specific files to be retained, removed, or transferred.

Figure 8:
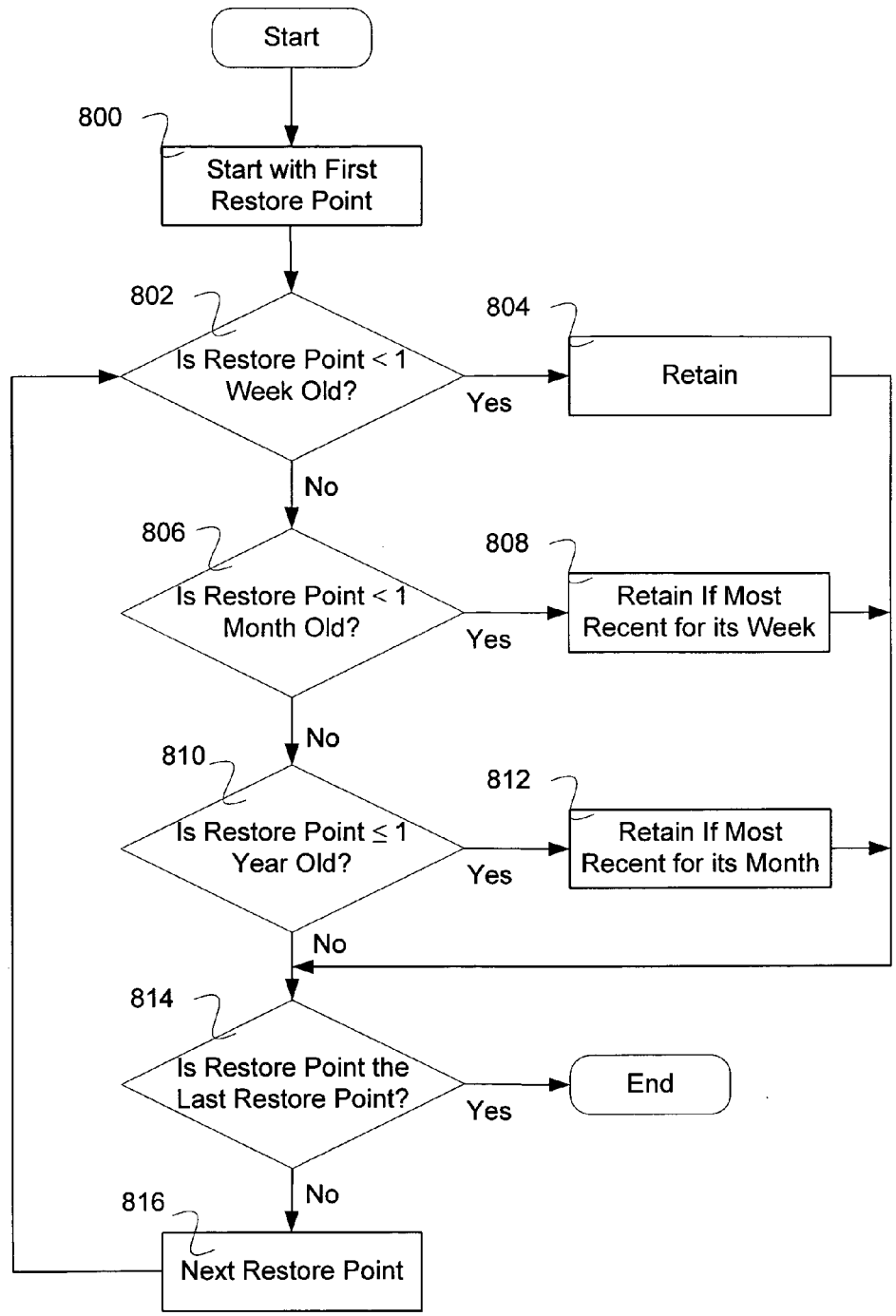
FIG. 8 illustrates an embodiment of a process for selecting restore points based on criteria.

FIG. 8 illustrates an embodiment of a process for selecting restore points based on criteria. In some embodiments, the process in FIG. 8 is used to implement 702 in FIG. 7. In 800, the process starts with the first restore point. In the example shown, in 802, it is determined if the restore point is less than 1 week old. If the restore point is less than 1 week old, then the restore point is retained in 804 and control is passed to 814. If the restore point is not less than 1 week old, then it is determined if the restore point is less than 1 month old in 806. If the restore point is less than 1 month old, then the restore point is retained if it is the most recent restore point for its week in 808. If the restore point is not less than 1 month old, then it is determined if the restore point is less than or equal to one year old in 810 and control passes to 814. If the restore point is less than or equal to one year old, then, then the restore point is retained if it is the most recent restore point for its month in 812 and control passes to 814. If the restore point is not less than 1 year old, then it is determined if it is the last restore point in 814. If it is the last restore point, then the process ends. If it is not the last point, the next restore point is selected in 816 and control passes to 802.

Figure 9:
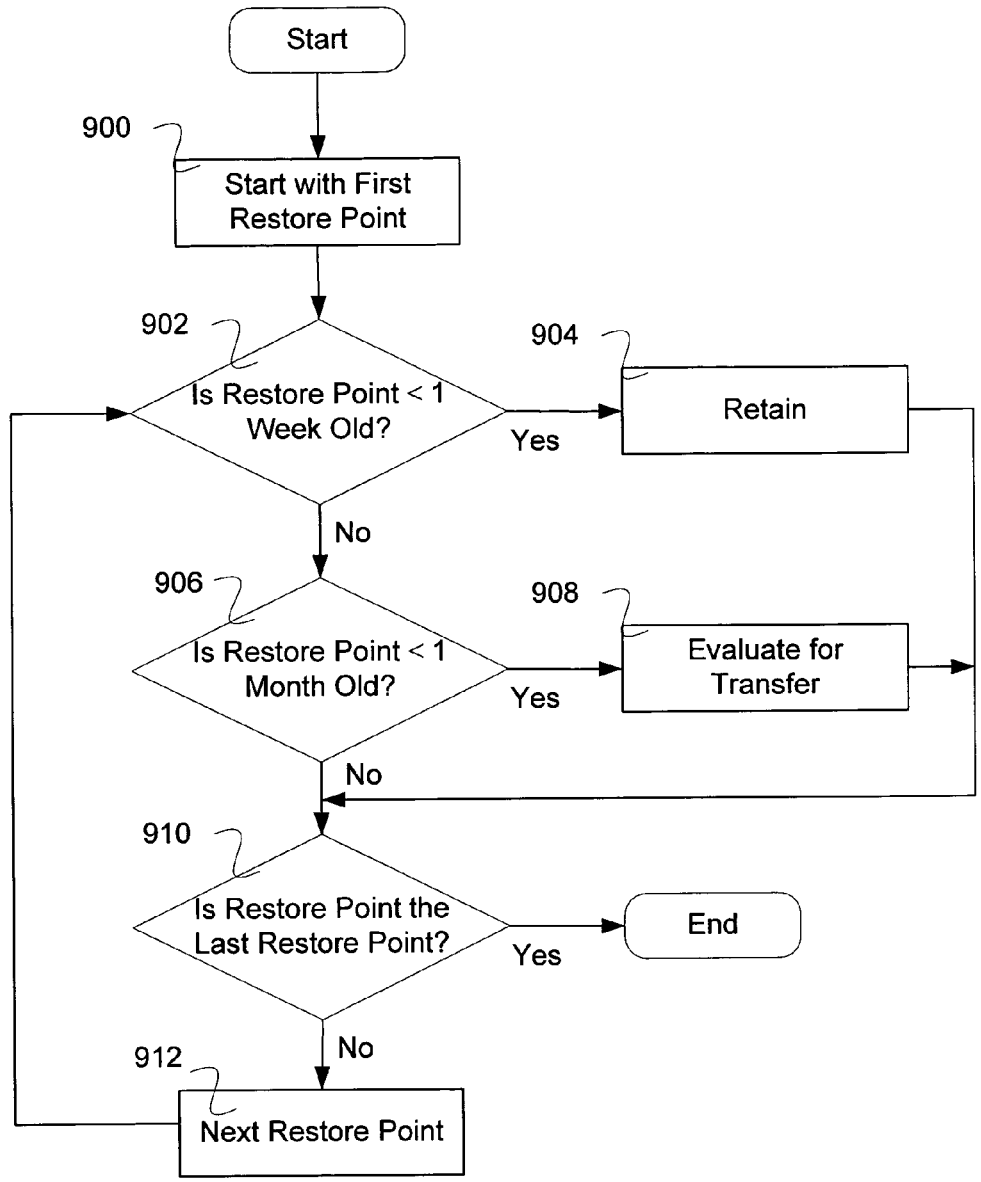
FIG. 9 illustrates an embodiment of a process for selecting restore points based on criteria.

FIG. 9 illustrates an embodiment of a process for selecting restore points based on criteria. In some embodiments, the process of FIG. 9 is used to implement 702 in FIG. 7. In the example shown, in 900, the process starts with the first restore point. In 902, it is determined if the restore point is less than 1 week old. If the restore point is less than 1 week old, then the restore point is retained in 904 and control is passed to 910. If the restore point is not less than 1 week old, then it is determined if the restore point is less than 1 month old in 906. If the restore point is less than 1 month old, then the restore point is evaluated for transfer in 908 and control is passed to 910. If the restore point is not less than 1 month old, then it is determined in 910 if it is the last restore point. If it is the last restore point, then the process ends. If it is not the last restore point, the next restore point is selected in 912 and control passes to 902.

Figure 10:
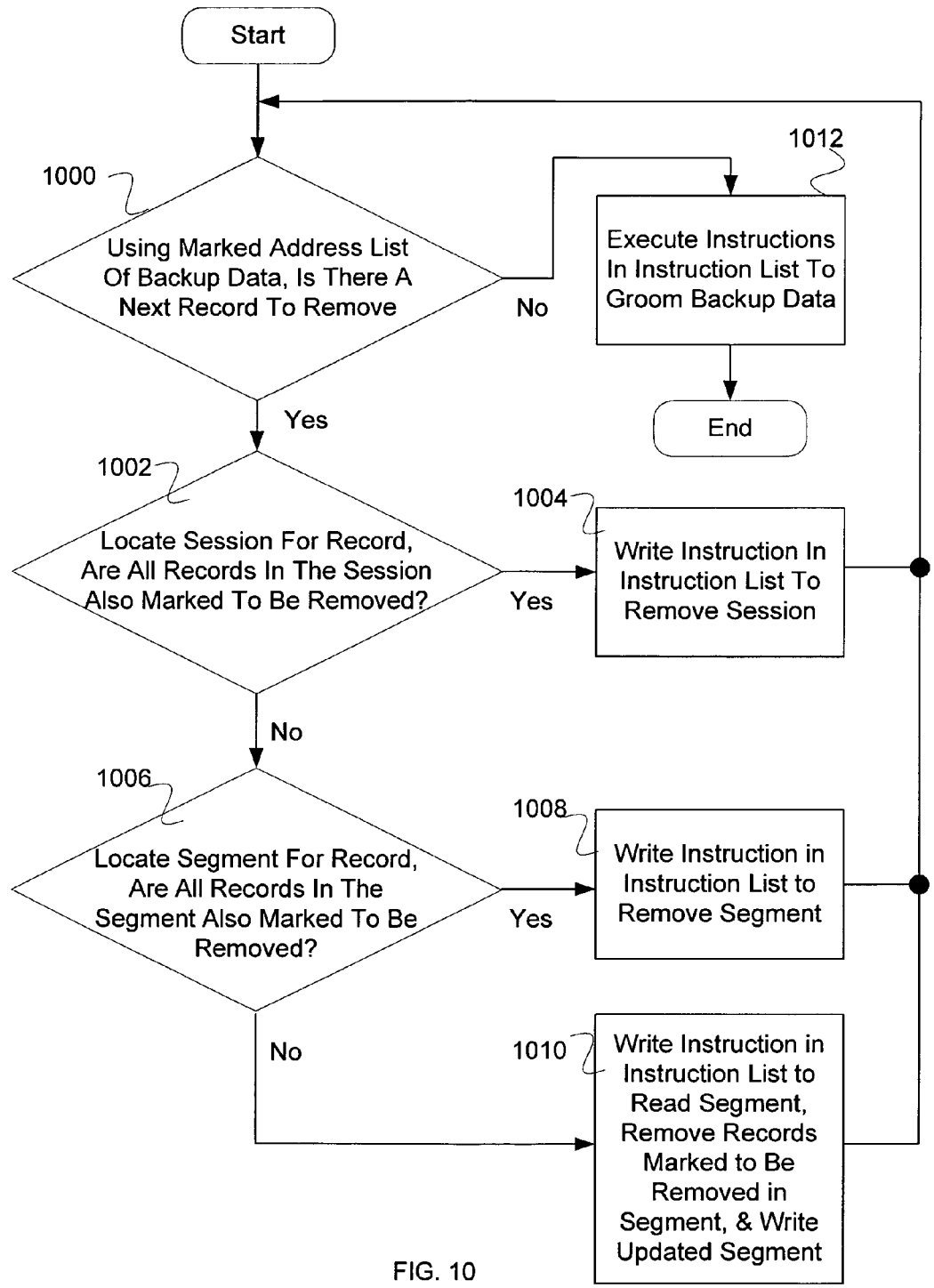
FIG. 10 illustrates an embodiment of a process for removing the data that is not to be retained.

FIG. 10 illustrates an embodiment of a process for removing the data that is not to be retained. In some embodiments, the process of FIG. 10 is used to implement 502 of FIG. 5. In the example shown, in 1000 it is determined using the marked address list of backup data if there is a next record to be removed. If there is not a next record to be removed, then instructions in the list to groom backup data are executed in 1012 and the process ends. If there is a next record to be removed, in 1002 the session for the record is located and it is determined if all records in the session are to be removed. In some embodiments, 1002 includes building for the session a list of addresses and sizes on the backup media for files (or other records) associated with the session and then marking in the session-specific list those files to be retained (or removed), e.g., based on the corresponding entries in the overall address/size lists created as described above in connection with FIG. 6. If all records in the session are to be removed, then in 1004 an instruction is written in the instruction list to delete the backup data associated with the session and associated session data, after which control is returned to 1000. In some embodiments the instruction written in 1004 identifies the session to be deleted by a date/time with which the session is associated. In some embodiments, in an iteration of 1000 performed after an instruction to delete an entire session has been written in 1004 any records associated with the session for which the deletion instruction was written are not considered. If not all records in the session are to be removed, then in 1006 it is determined if all records in the segment with which the record is associated are also to be removed. If all records in the segment are to be removed, then in 1008 an instruction is written in the instruction list to delete the segment and control is returned to 1000.

In some embodiments, in an iteration of 1000 performed after an instruction to delete an entire segment has been written in 1008 any records associated with the segment for which the deletion instruction was written are not considered. In some embodiments, if an instruction to delete an entire segment is written in 1008, a next record that is NOT to be removed is identified and an instruction is written to delete any intervening segments which, under those circumstances, would only be associated with records that are to be removed, and control only then returns to 1000, in which during the ensuing iteration of 1000 any records associated with a segment for which a deletion instruction was written are not considered. If not all records in the segment are to be removed, then in 1010 instructions are written in the instruction list to read the segment and write an updated segment that includes only those records in the segment that are to be retained, after which control is returned to 1000. In some embodiments, writing an updated segment includes reading the segment, removing the records that are to be removed and writing an updated segment that does not contain the records that were to be removed.

In some embodiments, the instruction list that is executed in 1012 is designed to help safeguard against the potential failure of the computer system at any time. The instruction list, along with tracking information, is used in such a way that it can be ascertained how many of the instructions in the instruction list have been executed. Thus, the state of the backup data set is known in the event that the grooming operation is interrupted. From this knowledge, the grooming process can be resumed and completed without regard to any interruptions or failures in between the start of the grooming and the time corresponding to the interruption. In some embodiments, the tracking information is designed to overcome a failure during a write operation including a failure during a writing operation that is writing tracking information.

Using the techniques described herein, data is selected for retention, removal, or transfer based at least in part on requirements for retention and availability, in some embodiments freeing up backup storage space to be used to store other data—for example, additional backup data that is desired to be retained.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for selecting data in a backup data set comprising:
   receiving data associated with one or more restore points associated with the backup data set, wherein each of the one or more restore points comprises a plurality of files in a plurality of directories as the plurality of files and the plurality of directories existed at a restore point time; and
   automatically selecting using a processor by evaluating a rule a restore point of said one or more restore points associated with the backup data set for transfer from the backup data set, wherein the automatic selection is based at least in part on an application associated with the restore point;
   receiving a blocked set of restore points, wherein the automatic selection of the restore point is overridden so that the restore point is deselected in the event that the restore point is blocked from retention; and
   receiving a locked set of restore points, wherein a not-automatically selected restore point of the locked set of restore points is selected for retention in the event that the restore point is locked for retention.

2. A method as in claim 1, wherein automatically selecting the restore point of said one or more restore points for transfer is based at least in part on selecting restore points at a first frequency for a first time period and selecting restore points at a second frequency for a second time period.

3. A method as in claim 1, wherein automatically selecting the restore point of said one or more restore points for transfer includes selecting a most recent restore point corresponding to previously selected restore points.

4. A method as in claim 1, wherein automatically selecting the restore point of said one or more restore points for transfer based at least in part on selecting restore points at a first frequency for a first computer system, application, or process and selecting restore points at a second frequency for a second computer system, application, or process.

5. A method as in claim 1, wherein automatically selecting the restore point of said one or more restore points for transfer includes selecting the restore point that has been locked to ensure it is selected.

6. A method as in claim 1, wherein automatically not selecting the restore point of said one or more restore points for transfer includes not selecting the restore point that has been blocked to ensure it is not selected.

7. A method as in claim 1, wherein automatically selecting the restore point of said one or more restore points for transfer includes selecting the restore point based on a backup criteria wherein the backup criteria indicates a time relevance requirement for backup data sets.

8. A method as in claim 1, wherein automatically selecting the restore point of said one or more restore points for transfer includes selecting the restore point based on a backup criteria wherein the backup criteria indicates an availability requirement for backup data sets.

9. A method as in claim 1, further comprising:
   receiving a selection criteria indicating a file type; and
   determining automatically using a processor based at least in part on the selection criteria which files comprising the backup data set are for transfer from the backup data set, wherein the automatic selection is based at least in part on an availability requirement for the files specifying a first physical building location of a first storage device to transfer from and a second physical building location of a second storage device to transfer the restore point to.

10. A method as in claim 9, wherein the file type includes files with a filename extension associated with the file type.

11. A method as in claim 9, wherein the file type includes files associated with a program with which the file type is associated.

12. A method as in claim 9, wherein the file type includes files associated with a database program with which the file type is associated.

13. A computer program product for selecting data in a backup data set, the computer program product being embodied in a computer readable storage medium and comprising computer instructions for:
   receiving data associated with one or more restore points associated with the backup data set, wherein each of the one or more restore points comprises a plurality of files in a plurality of directories as the plurality of files and the plurality of directories existed at a restore point time; and
   automatically selecting by evaluating a rule one or more of said one or more restore points for transfer from the backup data set, wherein the automatic selection is based at least in part on an application associated with the restore point;

receiving a blocked set of restore points, wherein the automatic selection of the restore point is overridden so that the restore point is deselected in the event that the restore point is blocked from retention; and receiving a locked set of restore points, wherein a not-automatically selected restore point of the locked set of restore points is selected for retention in the event that the restore point is locked for retention.

14. A computer program product as recited in claim 13, wherein automatically selecting the restore point of said one or more restore points for transfer is based at least in part on selecting restore points at a first frequency for a first time period and selecting restore points at a second frequency for a second time period.

15. A computer program product as recited in claim 13, wherein automatically selecting the restore point of said one or more restore points for is based at least in part on selecting restore points at a first frequency for a first computer system, application, or process and selecting restore points at a second frequency for a second computer system, application, or process.

16. A computer program product as recited in claim 13, wherein automatically selecting the restore point of said one or more restore points for transfer includes selecting the restore point that has been locked to ensure it is selected.

17. A computer program product as recited in claim 13, wherein automatically not selecting the restore point of said one or more restore points for transfer includes not selecting the restore point that has been blocked to ensure it is not selected.

18. A computer program product as recited in claim 13, wherein automatically selecting the restore point of said one or more restore points for transfer includes selecting the restore point based on a backup criteria wherein the backup criteria indicates a time relevance requirement for backup data sets.

19. A computer program product as recited in claim 13, wherein automatically selecting a\the restore point of said one or more restore points for transfer includes selecting the restore point based on a backup criteria wherein the backup criteria indicates an availability requirement for backup data sets.

20. A computer program product as recited in claim 13, further comprising computer instructions for:

receiving a selection criteria indicating a file type; and determining automatically based at least in part on the selection criteria which files comprising the backup data set are for transfer from the backup data set, wherein the automatic selection is based at least in part on an availability requirement for the files specifying a first physical building location of a first storage device to transfer from and a second physical building location of a second storage device to transfer the restore point to.

21. A computer program product as recited in claim 20, wherein the file type includes files with a filename extension associated with the file type.

22. A computer program product as recited in claim 20, wherein the file type includes files associated with a program with which the file type is associated.

23. A computer program product as recited in claim 20, wherein the file type includes files associated with a database program with which the file type is associated.

24. A system for selecting data in a backup data set comprising:

a processor configured to:

receive data associated with one or more restore points associated with the backup data set, wherein each of the one or more restore points comprises a plurality of files in a plurality of directories as the plurality of files and the plurality of directories existed at a restore point time; and automatically select by evaluating a rule a restore point of said one or more restore points for transfer from the backup data set, wherein the automatic selection is based at least in part on an application associated with the restore point;

receive a blocked set of restore points, wherein the automatic selection of the restore point is overridden so that the restore point is deselected in the event that the restore point is blocked from retention; and receive a locked set of restore points, wherein a not-automatically selected restore point of the locked set of restore points is selected for retention in the event that the restore point is locked for retention; and a memory coupled to the processor and configured to provide instructions to the processor.

25. A system as in claim 24, wherein automatically selecting the restore point of said one or more restore points for transfer is based at least in part on selecting restore points at a first frequency for a first time period and selecting restore points at a second frequency for a second time period.

26. A system as in claim 24, wherein automatically selecting the restore point of said one or more restore points for transfer is based at least in part on selecting restore points at a first frequency for a first computer system, application, or process and selecting restore points at a second frequency for a second computer system, application, or process.

27. A system as in claim 24, wherein automatically selecting the restore point of said one or more restore points for transfer includes selecting the restore point that has been locked to ensure it is selected.

28. A system as in claim 24, wherein automatically not selecting the restore point of said one or more restore points for transfer includes not selecting the restore point that has been blocked to ensure it is not selected.

29. A system as in claim 24, wherein automatically selecting the restore point of said one or more restore points for transfer includes selecting the restore point based on a backup criteria wherein the backup criteria indicates a time relevance requirement for backup data sets.

30. A system as in claim 24, wherein automatically selecting restore point of said one or more restore points for retention, removal, or transfer includes selecting the restore point based on a backup criteria wherein the backup criteria indicates an availability requirement for backup data sets.

31. A system as in claim 24, wherein the processor is further configured to:

receive a selection criteria indicating a file type; and determine automatically based at least in part on the selection criteria which files comprising the backup data set are for transfer from the backup data set, wherein the automatic selection is based at least in part on an availability requirement for the files specifying a first physical building location of a first storage device to transfer from and a second physical building location of a second storage device to transfer the restore point to.

32. A system as in claim 31, wherein the file type includes files with a filename extension associated with the file type.

33. A system as in claim 31, wherein the file type includes files associated with a program with which the file type is associated.

34. A system as in claim 31, wherein the file type includes files associated with a database program with which the file type is associated.

35. A method as in claim 1, wherein the transfer occurs when triggered.

36. A method as in claim 35, wherein the trigger comprises one or more of the following: an indication of a full storage device, an indication of a number of allowed backup on a media, an indication of a scheduled time, an indication of a manual trigger, or an indication of a trigger from a system external to the backup system.

37. A computer program product as in claim 20, wherein the transfer occurs when triggered.

38. A computer program product as in claim 37, wherein the trigger comprises one or more of the following: an indication of a full storage device, an indication of a number of allowed backup on a media, an indication of a scheduled time, an indication of a manual trigger, or an indication of a trigger from a system external to the backup system.

39. A system as in claim 24, wherein the transfer occurs when triggered.

40. A system as in claim 39, wherein the trigger comprises one or more of the following: an indication of a full storage device, an indication of a number of allowed backup on a media, an indication of a scheduled time, an indication of a manual trigger, or an indication of a trigger from a system external to the backup system.

* * * * *